United States Patent [19]

Herloski

[11] Patent Number: 5,018,025
[45] Date of Patent: May 21, 1991

[54] INPUT OF CONTROL INFORMATION TO AN ELECTRONIC IMAGE SCANNER THROUGH THE IMAGING APPARATUS

[75] Inventor: Robert P. Herloski, Webster, N.Y.
[73] Assignee: Xerox Corporation, Stamford, Conn.
[21] Appl. No.: 437,703
[22] Filed: Nov. 17, 1989
[51] Int. Cl.⁵ .......................................... H04M 1/40
[52] U.S. Cl. ................................. 358/471; 358/474; 358/488; 358/452; 358/466
[58] Field of Search ............... 358/471, 474, 482, 483, 358/468, 452, 465, 466; 350/578; 382/59; 235/472, 463

[56] References Cited
U.S. PATENT DOCUMENTS

| | | | |
|---|---|---|---|
| 4,147,295 | 4/1979 | Nojiri et al. | 235/463 |
| 4,162,408 | 7/1979 | Hansen | 250/555 |
| 4,264,808 | 4/1981 | Owens et al. | 358/447 |
| 4,384,272 | 5/1983 | Tanaka et al. | 382/50 |
| 4,716,438 | 12/1987 | Farrell | 355/6 |
| 4,724,330 | 2/1988 | Tuhro | 250/578 |
| 4,793,812 | 12/1988 | Sussman et al. | 358/483 |
| 4,812,918 | 3/1989 | Carbone | 358/476 |
| 4,831,458 | 5/1989 | Watanabe | 358/474 |

Primary Examiner—Edward L. Coles, Sr.
Attorney, Agent, or Firm—Mark Costello

[57] ABSTRACT

In an electronic image scanning device having an array of photosensitive elements, or photosites, arranged and supported for deriving electronic image information from an original, an arrangement for input of control information to the device includes a surface with a plurality of unique control images thereon, detectable by the photosites, is arranged for operator controlled movement. The scanning of the control images occurs during a non-image scanning period in the operation of the scanning device. The unique control images are recognized as control information. The operator controlled movement reflects operator selection of control information.

20 Claims, 5 Drawing Sheets

INPUT OF CONTROL INFORMATION TO AN ELECTRONIC IMAGE SCANNER THROUGH THE IMAGING APPARATUS

The present invention relates generally to the input of control information for electronic image reproduction in an image scanning device, and more particularly to a method and apparatus for providing variable control of electronic image reproduction by input of control information through the imaging arrangement.

BACKGROUND OF THE INVENTION

Setting control values for electronic image reproduction and processing in an electronic image scanner is generally accomplished by the input of information to a controller from an operator control panel and display. However, such arrangements necessitate an interface between the controls, the display and the controller, and between the controller and, for example, an image processing circuit. This requires a number of electrical connections of substantial complexity for the purpose of entering this control information. Buttons or switches must be provided, which upon actuation, provide an electrical signal to a control system indicating a desired condition. Generally, information regarding the control information or selection is also given to the operator simultaneously with its entry.

U.S. Pat. No. 4,162,408 to Hansen shows an apparatus for dynamically varying a reference threshold level when a mark or object is sensed moving across optics of the apparatus. U.S. Pat. No. 4,384,272 to Tanaka et al. discloses an image reading apparatus with movable marking members shaded to a predetermined density for determining the required reading area on a surface and the required illumination of the area. The marking member is detected by the image sensor. U.S. Pat. No. 4,147,295 to Nojiri et al. suggests a system for automatically correcting a threshold value of each bar in a bar code recognition system. The system comprises a movable card with a plurality of bars arranged in parallel on the card, a lens for converging the light reflected from each bar, and an image sensor which generates an image signal having a level corresponding to the light density of the reflected light. The threshold value with reference to which each bar width is discriminated is determined upon scanning the bars in order to enhance the recognition operation of the system. U.S. Pat. No. 4,724,330 to Tuhro suggests that an electronic input scanner may use a target for electronic acquisition and storage of registration information. U.S. Pat. No. 4,716,438 to Farrell discloses an arrangement in which machine control information is taken from a coded job sheet directed through a document handler.

It would be highly desirable to use a less expensive mechanical control information selection arrangement, in conjunction with the already existing imaging arrangement to provide a control information input to an image scanner.

SUMMARY OF THE INVENTION

In accordance with the invention there is provided a method and apparatus for directing control information to an electronic scanning device through the image sensing portion of the device.

In accordance with one aspect of the invention, in an electronic image scanning device having an array of photosensitive elements, or photosites, arranged and supported for deriving electronic image information from an original, an arrangement for input of control information to the device is provided. A surface with a plurality of unique control images thereon, detectable by the photosites, is arranged for operator controlled movement. The scanning of the control images occurs during a non-image scanning period in the operation of the scanning device. The unique control images are recognized as control information. The operator controlled movement reflects operator selection of control information.

In accordance with another aspect of the invention, screens and/or threshold levels, as well as other control or image processing information can be set by providing selection information to the electronic image scanning device through the imaging arrangement of an image scanner. In one possible embodiment, a disk-shaped member, journaled for rotation in response to operator selected movement, has arranged about its periphery a plurality of bars printed on the disk such that as rotation of the disk brings a bar into scanning position, the bar presents a unique length for scanning by the imaging arrangement. In this embodiment, the imaging by a selected number of photosites of any bar provides a unique control signal.

In accordance with yet another aspect of the invention, in one embodiment, the disk-shaped member is also provided with operator viewable information corresponding to each unique control selection, providing operator viewable information indicating each control selection when the unique control image is in position for scanning.

The value of loading selection through the scanning array offers significant possibilities for other information loading beside the screening and thresholding. No separate bar coding reader or bar code information is required.

BRIEF DESCRIPTION OF THE DRAWINGS

These and other aspects of the invention will become apparent from the following description used to illustrate a preferred embodiment of the invention read in conjunction with the accompanying drawings in which.

DETAILED DESCRIPTION OF THE PREFERRED EMBODIMENT

In the ensuing description, "electronic fast scan direction" refers to the direction in which the scanning array 50 scans, "mechanical fast scan direction" refers to the direction perpendicular to the electronic fast scan direction in which the scan head 60 moves, and "mechanical slow scan direction" refers to the direction parallel to the electronic fast scan direction in which the scan carriage 40 moves. "Image line" (L) refers to the line parallel to the electronic fast scan direction, while "scan line" (SL) refers to the scan lines parallel to the mechanical fast scan direction.

Figure 1:
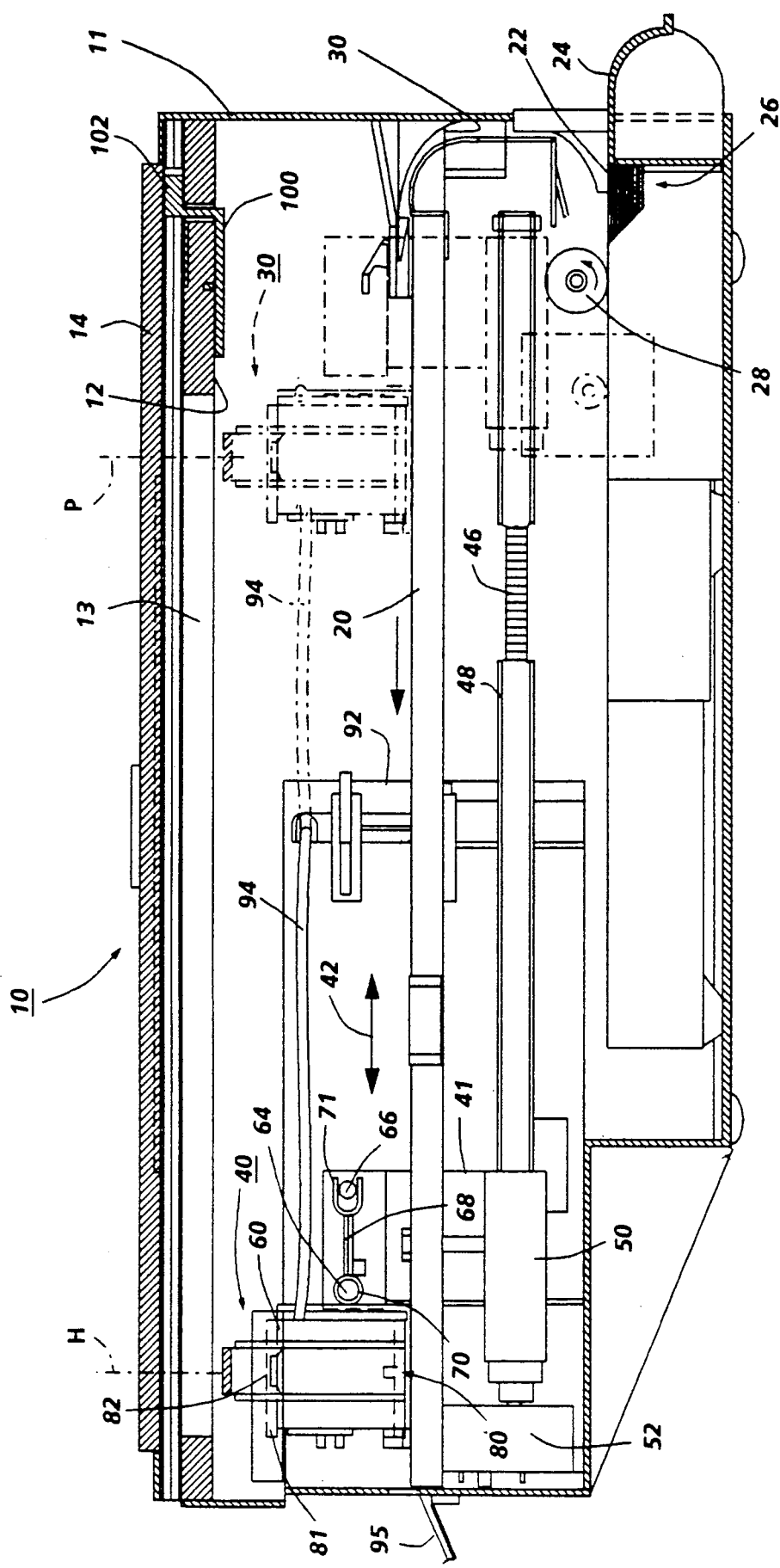
FIG. 1 is a side view of a scanner-printer incorporating the slow scan context image processing of the present invention.

Referring to FIG. 1 of the drawings, the scanner is shown and described herein in combination with a printer, the combination being referred to and identified herein as scanner-printer 10. While a combination scanner-printer is shown and described, scanner 10 may comprise a stand alone scanner usable by itself or in combination with output devices other than a printer such as a facsimile transmitter, memory, communication channel, etc.

Scanner-printer 10 has a relatively compact generally rectangular frame structure or housing 11, including an upper surface 12 having inset therein a generally rectangular transparent glass scan platen 13 of preset size on which the document to be copied is placed. Platen 13 includes a suitable border with registration indicia (not shown) to facilitate placing of a document in proper position for copying.

While the document is being positioned on scan platen 16 manually, it will be understood that a suitable automatic document feeder (not shown) may be used for this purpose.

A print platen 20 is located interiorly of housing 11 in predetermined spaced relation below scan platen 13, print platen 20 being in a plane substantially parallel to that of scan platen 13. Print platen 20, as will appear, serves as a support for the copy substrate material, shown here as copy sheets 22, on which the copy of the document is to be printed. A removable copy sheet source in the form of a paper tray cassette 24 is slidably fitted into a slot-like opening provided in housing 11 below platen 20 adjacent the housing base, cassette 24 having therewithin a stack 26 of copy sheets 22. A scuffing feed roll 28 serves, when actuated, to feed the topmost copy sheet in stack 26 through a turn-around baffle 30 onto print platen 20.

A scan-print carriage 40 is supported for scanning movement in both the mechanical fast and slow scan directions in housing 11 between scan and print platens 13, 20 respectively. A slow scan base 41 supports a fast scan head 40 for reciprocating back and forth movement in the mechanical fast scan direction (shown by the double ended arrow 42), slow scan base 41 itself being supported by lead screw 46 proximate one side of slow scan base 41 and a cam member structure 48. Lead screw 46, which is drivingly coupled to slow scan base 41 by an internally threaded nut 50, is rotated by reversible motor 52 to selectively move slow scan base 41 and scan-print carriage 40 supported thereon back and forth in the mechanical slow scan direction at a controlled step scanning rate.

Figure 2:
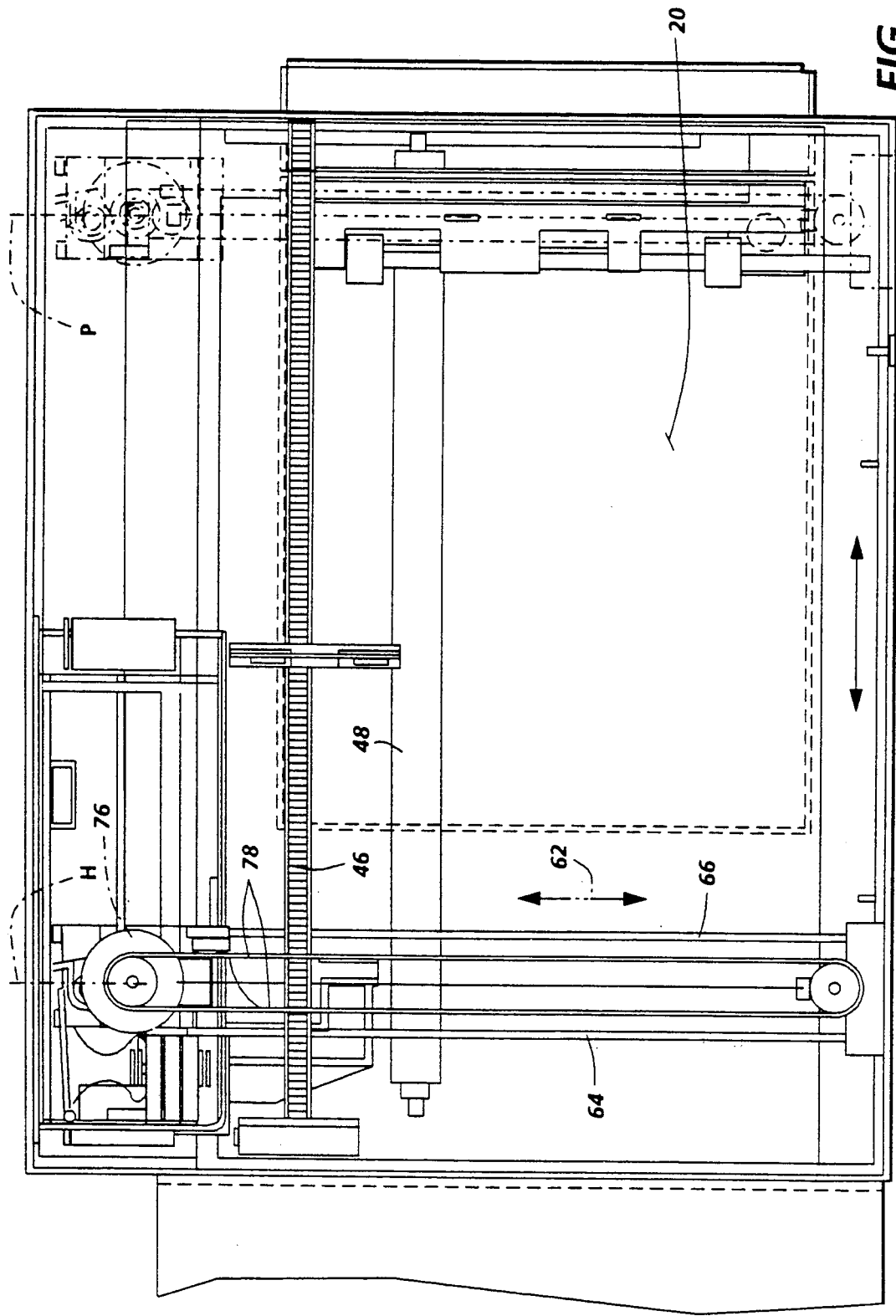
FIG. 2 is a top view of the scanner-printer shown in FIG. 1.

As shown in FIGS. 1 and 2, carriage 40 also includes a fast scan head 60 supported on base 41 for reciprocating back and forth movement in the mechanical fast scan direction (shown by the dotted line arrow 62) by means of a cooperating journal rod 64 and support rod 66, fast scan head 60 having a side extension 68 with suitable openings 70, 71 within which rods 64, 66 are received. Carriage 40 is moved in the mechanical fast scan direction by a drive motor 76 mounted on carriage 40, motor 76 being drivingly coupled to carriage 40 by belt and pulley driver 78.

Figure 3:
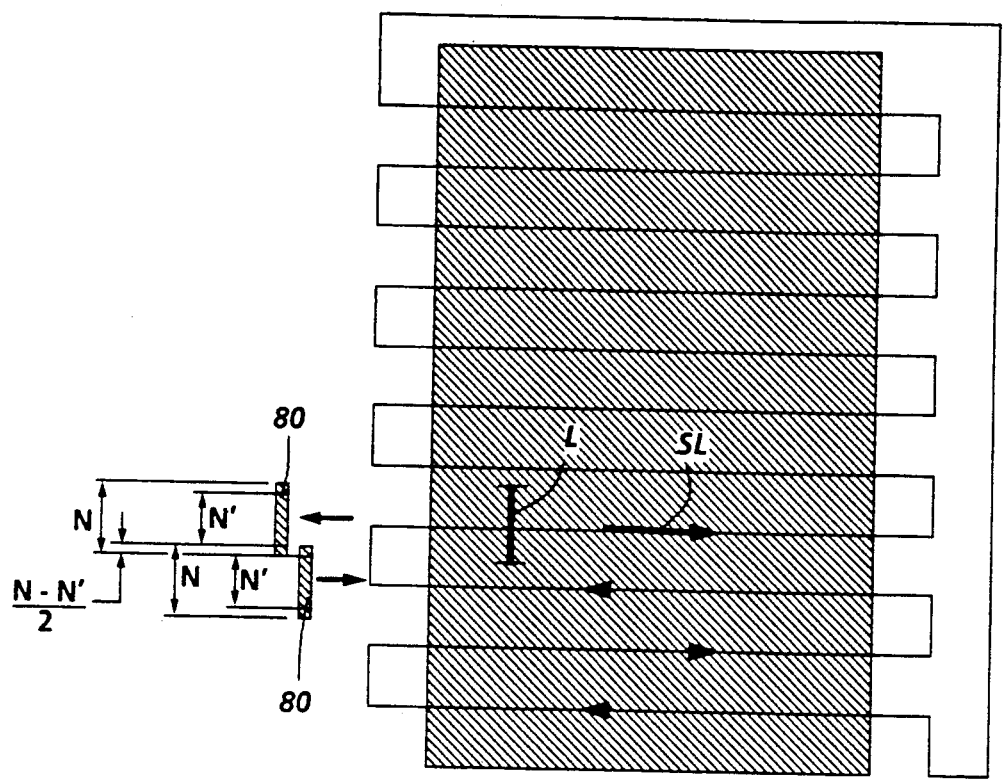
FIG. 3 shows the scanning movement of the scan head of FIGS. 1 and 2.

To scan and convert the image content of the document on platen 16 into image signals suitable for printing, a linear scanning array 80 such as a CCD is mounted on fast scan head 60 covered with a glass filter 81 such that the electronic fast scan direction of array 80 is perpendicular to the mechanical fast scan direction and parallel to the mechanical slow scan direction. A gradient index fiber lens array 82 focuses the individual photosensors or photosensitive elements of array 80 on scan platen 16 and the document resting thereon. Scanning array 80 has a preset number N of photosensors, array 80 together with lens array 82 being sized so as to scan a predetermined number N of pixels P. Because of the orientation of scanning array 80, each scan of array 80 also crosses a like-sized block of N image lines. At least one and perhaps two lamps (not shown) mounted on fast scan head 60 illuminate the scan line viewed by array 80 through lens array 82. As seen in FIG. 3, scanning array 80 overscans, the number N of pixels P scanned by array 80 being larger than the number N' of pixels processed. As a result, each scan line SL includes a total overscanned area $N-N'$, the number of pixels in each overscanned area being equal to $N-N'/2$.

A linear printing array (not shown) such as a thermal ink jet head, is mounted on carriage 40 below, facing platen 20, and in alignment with scanning array 80, the axis of printing array 90 also being perpendicular to the mechanical fast scan direction. The printing array has a number of printer elements, with the array being sized to print a block of pixels such that the number of pixels printed by the array in each print line is equal to the number of pixels processed from the scanning array 80. At the home position of the carriage (shown in solid lines) the fast scan head 60 docks in a maintenance position adapted to maintain the ink jet array openings and think therein a moistened condition. Additionally, the ink jet array is connected to a sump 92 of liquid ink to maintain the ink supply therein, via a supply tube 94.

A suitable control system (not shown) with operator control panel for inputting program instructions to scanner-printer 10 is provided.

During operation of scanner-printer 10, the document to be copied is placed in registered position on scan platen 13, scan-print carriage 40 being normally parked in the home position H. Copy sheet feed roll 28 is actuated to feed a copy sheet 22 into registered position adjacent print platen 20. Carriage 40 is driven by motor 52 via lead screw 46 in the slow scan direction (shown by the arrow 42) at a predetermined scanning rate to a start of pickup position P (shown in phantom). If copying to a blank sheet is desired, a blank sheet is advanced from the tray to a registered position at platen 20. At platen 20, a sheet grabbing arrangement (not shown) on carriage 40 grabs the sheet, and carries the lead edge of the sheet back to the home position at a registered position for printing. With a blank sheet in position for printing, the carriage 40 is incrementally moved in the slow scan direction, and the head 60 is moved in the mechanical fast scan direction for image acquisition and printing during movement increments as shown in FIG. 3. Upon completion of the scanning motion in the slow scan direction, the carriage 40 is returned to the home position, from the pickup position P, picking up a second sheet of paper if required and simultaneously pushing the printed sheet of paper out to the machine with a sheet pushing member (not shown) into tray 95. As described, scanning array 80 scans in the electronic fast scan direction. It will be noted that there is some amount of overscanning in both the mechanical slow scan direction and the mechanical fast scan direction.

In scanner-printer 10, the printing array on carriage 40 may be actuated to substantially simultaneously print the block of image lines scanned by array 80 on the copy sheet 22 resting on print platen 20.

As might be expected in conjunction with an image scanning device, various image processing functions are available for altering the appearance of the document image acquired at the scanning array. Two particularly common functions are screening and thresholding. Data is initially derived in an analog form, and then converted to a digital value. Then, thresholding functions typically compare the image data with a uniform level across an image, to provide a binary output from the digital image data. Varying the threshold level varies the contrast of the image. Screening is a similar function, used to simulate gray levels within an image. Over a unit area of several pixels in the image, a series of threshold levels are applied to the image data so that a binary output is still produced, but varying over the unit area, depending on the density of the level of grey in the original image. Different screens apply different patterns of threshold levels to achieve different effects. It is highly desirable to provide a plurality of threshold levels and screens in a scanning device. The application of screens and thresholds to image data, as well as the types of screens is well known.

Figure 4:
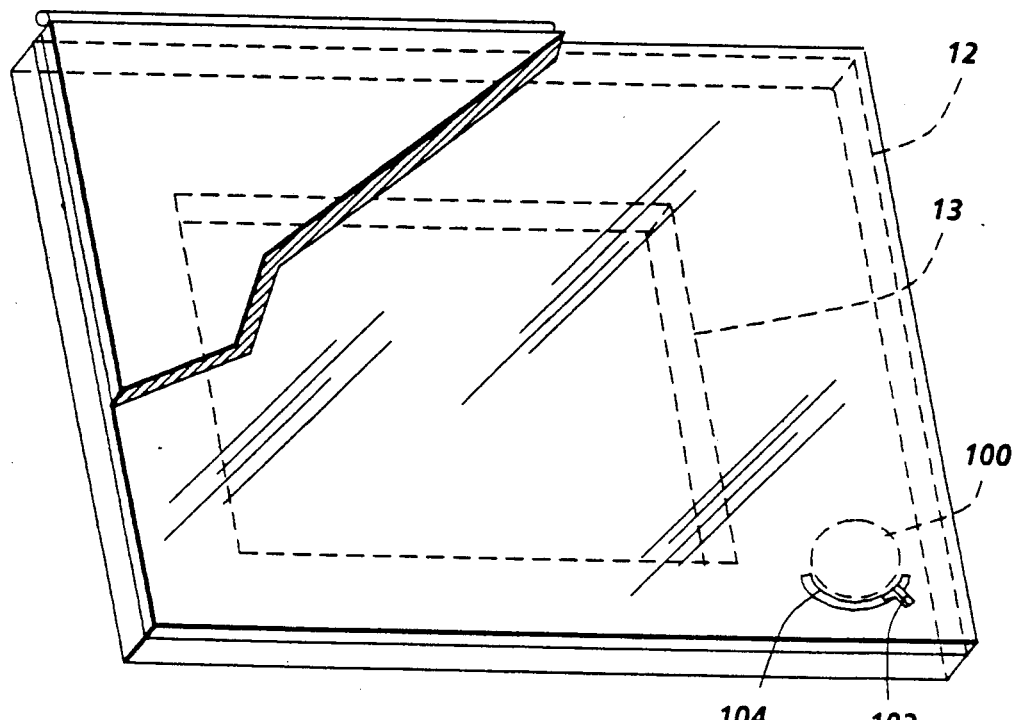
FIG. 4 shows an isometric top cut away view of the scanner upper surface and platen cover.
Figure 5A:
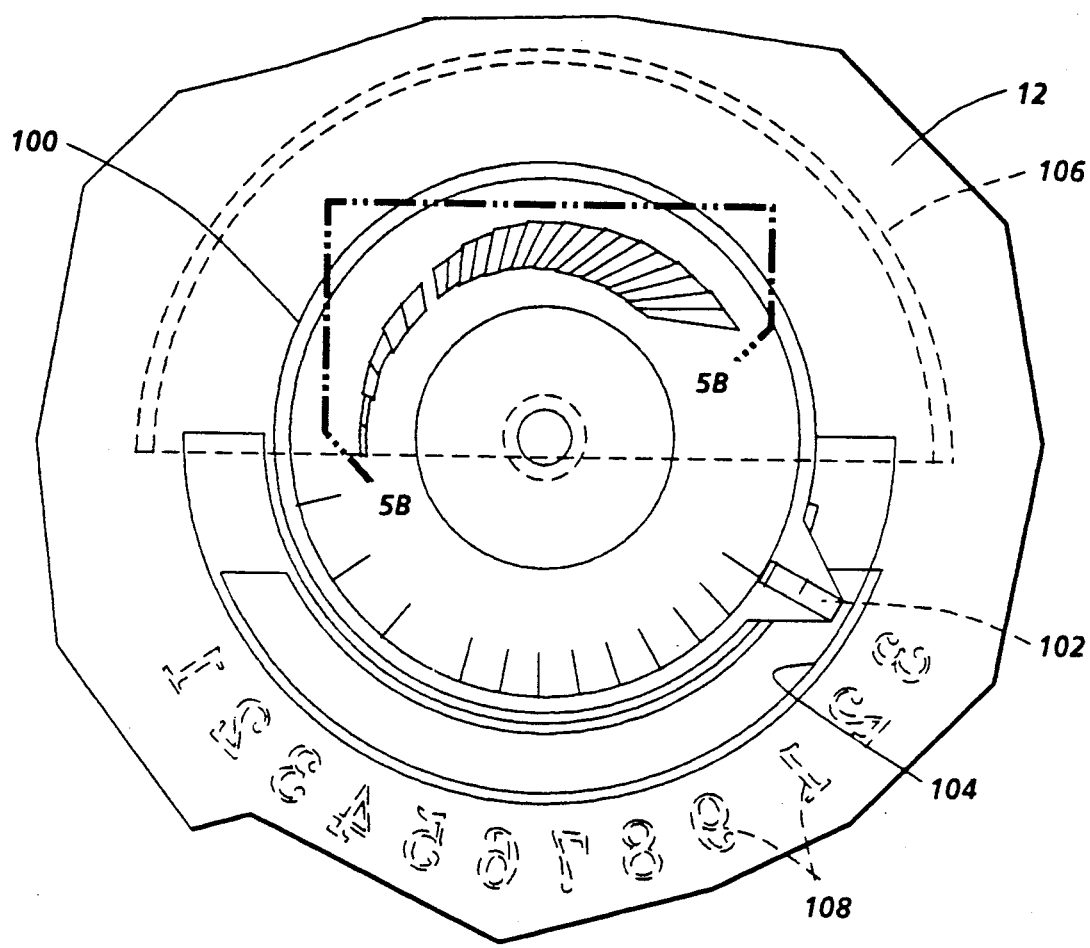
FIGS. 5A and 5B show the sliding scale of the invention.

In accordance with the invention, to instruct the image processing system which screen or threshold function to use, a simple slide switch, and as best seen in FIGS. 1 and 4 and the worm's eye view of FIG. 5, a sliding indicator member 100 is provided in the upper surface 12 of enclosure 11. The sliding indicator 100 is a disk-shaped member mounted for rotational movement on the upper surface 12 of the enclosure 11. On the disk upper surface, slide handle member 102 is available exterior to enclosure 12, movable along curved slot 104 to rotate sliding indicator 100. Sliding indicator 100 is held in its position relative to upper surface 12 of the enclosure with a complementary receiving slot 106, into which the sliding indicator 100 is snap fit. While this description is given to describe one embodiment of the invention, as will become apparent, there is a large range of manually operable indicators that may be used, including for example, a linear array of line segments of different lengths, slidable in a linear direction to bring a line segment to a scanning position.

On the exterior of upper surface 12, there are molded into the surface a plurality of markings 108 (shown in phantom in FIG. 5) indicative of the type of screen or threshold level that the sliding indicator is set to. Setting the slide handle 102 to one of these markings is indicative of the type of threshold level or screen selected.

Figure 5B:
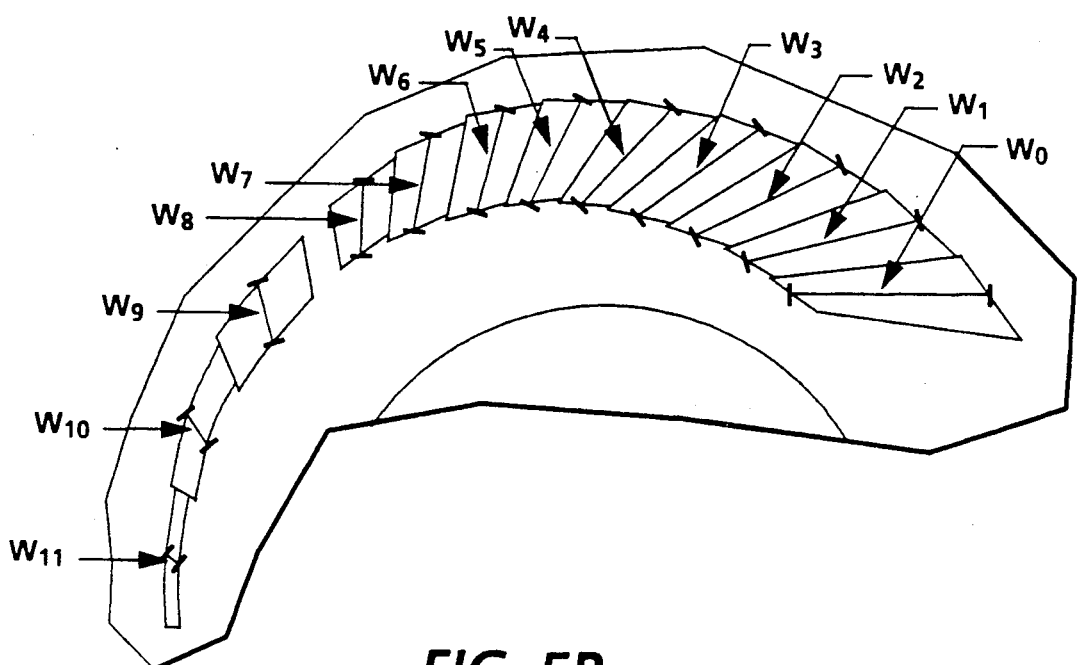

On the lower surface of sliding indicator 100, are formed a pattern of indicia 120 having different width $W_x$, as best shown in FIG. 5B. Each unique width $W_1$–$W_{11}$ corresponds to a preset threshold level or screen function that may be applied. As the sliding indicator is rotated for selection of one of the functions, the rotation brings a portion of indicia pattern 120 having a unique width into view of scanning array 80 during a portion of the overscanning path (with reference to FIG. 3). In one embodiment, indicia 120 is a white pattern on a black background, which may be formed easily and accurately by injection molding a white plastic into a black plastic.

Figure 6:
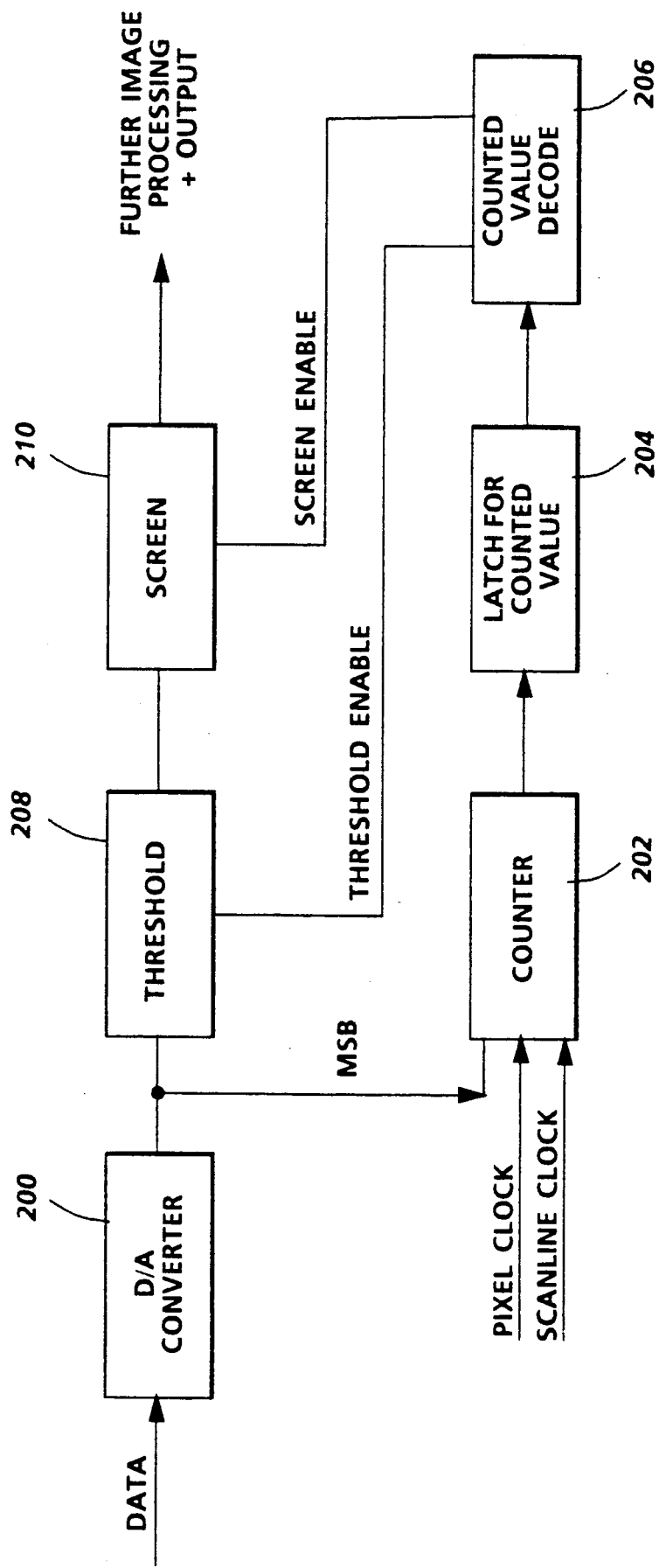
FIG. 6 shows a block diagram of a conversion circuit for use with the present invention.

With reference to FIG. 6, when the scanning array passes a predetermined position, data derived from the scanning array is converted from an analog to digital value at a/d converter 200 and the one or two most significant bits are reviewed for transition points indicative of the change in response from black to white upon first detection. Detection of a first transition starts counter 202 driven by the pixel clocking signal, and detection of a second transition or the end of the scan line clocking signal stops the clock from running. The counter value is loaded into a latch 204, such loaded value representing a measurement of the width of that portion of the indicia detected by the scanning array 80. The threshold and screen functions are mapped on a range of values around the widths of the indicia, for example as follows:

| WIDTH # | SIZE (mm) | PIXEL WIDTH | PIXEL RANGE | SETTING |
| --- | --- | --- | --- | --- |
| 1 | 11.596 | 136 | 132–192 | Threshold 0 |
| 2 | 10.167 | 125 | 120–131 | Threshold 1 |
| 3 | 9.652 | 113 | 109–119 | Threshold 2 |
| 4 | 8.687 | 102 | 96–108 | Threshold 3 |
| 5 | 7.772 | 91 | 86–95 | Threshold 4 |
| 6 | 6.756 | 79 | 74–85 | Threshold 5 |
| 7 | 5.791 | 68 | 63–73 | Threshold 6 |
| 8 | 4.826 | 56 | 52–62 | Threshold 7 |
| 9 | 3.861 | 45 | 40–51 | Threshold 8 |
| 10 | 2.896 | 34 | 29–39 | Screen 1 |
| 11 | 1.93 | 22 | 16–28 | Screen 2 |
| 12 | 0.956 | 11 | 0–15 | Screen 3 |

The value of latch 204 is available to counted value decoder 206 which converts the width of the segment in pixels to an enable signal for the threshold and screening functions 208 and 210, to operate in accordance with stored functions threshold and screening memories 212 and 214. This might be accomplished through a look-up table or the like.

The value of loading selection through the scanning array offers significant possibilities for other information loading beside the screening and thresholding. No separate bar coding reader or bar code information is required. Thus, for example, copy count, darkness level, programmed function selection, and other operating information may be entered through the scanning array, by using the array to measure a value at a predetermined position, and map such values onto stored function selection. Additionally, while the present invention has been described with respect to a scanning device with mechanical movement in both slow and fast scan directions, there is in principle no reason why the invention will not work equally as well in a line by line scanner with movement only in the slow scan direction, or other arrangement for scanning.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

I claim:

1. In an input scanner for deriving an electronic representation of an original image, including an array of photosites detecting the intensity of light from the original image, scanning means for providing relative movement between the photosite array and the original image to allow the original image to be scanned by the photosites; and variable control characteristics selectable by an operator for controlling the processing of the electronic representation of the original image, a control information input arrangement including:

a control information input member having a first surface with a plurality of unique control indicia representative of said variable control characteristics thereon, and supported at a position for scanning by the photosites at a non-image scanning time;

means for moving said first surface in accordance with operator selection of one of the unique control indicia; and means for varying said variable control characteristics in accordance with detection of one of the unique control indicia.

2. The control information input arrangement as defined in claim 1 and including a second surface, movable in accordance with said first surface movement, and providing an operator viewable indication of the selected control characteristic.

3. In an input scanner for deriving an electronic representation of an original image, including a generally linear array of photosites detecting the intensity of light from the original image, means for providing relative movement between the photosite array and the original image to allow the original image to be scanned by the photosites; and variable control characteristics selectable by an operator for controlling the processing of the electronic representation of the original image, a control information input arrangement including:

a control information input member having a first surface selectably movable for selection of control characteristic and having a plurality of unique control images thereon, and supported for scanning by the photosites at a non-image scanning time, each control image representing one of a selected group control characteristics, and defined on said surface by sensor detectable markings;

a counter for counting the number of photosites in the array at which a portion of the control image is detected to produce a count number;

means for enabling said counter upon detection of the selected control image;

means for determining from said counted number the control characteristic to be applied to said scanned image.

4. The device as defined in claim 3 wherein each said unique control image includes a line on a contrasting background, arranged for detection by said photosite array on said first surface and oriented with a long edge parallel to the array of photosites.

5. The device as defined in claim 4 wherein said line on said contrasting background includes at least one transition from the background to the line.

6. The device as defined in claim 5 wherein said means for enabling said counter includes a transition detecting arrangement, wherein upon detection of a first transition, counting is started.

7. The device as defined in claim 6 wherein said transition detecting arrangement stops counting by said counter if a second transition is detected.

8. The device as defined in claim 3 wherein the control characteristic to be applied to the electronic representation of the original image is a threshold function.

9. The device as defined in claim 3 wherein the control characteristic to be applied to the electronic representation of the original image is a screening function.

10. The device as defined in claim 3 wherein the control characteristic to be applied is one of a selected group of screening and threshold functions.

11. The control information input arrangement as defined in claim 3 and including a second surface, movable in accordance with said first surface movement, and providing operator viewable indications of the selected control characteristics.

12. In an input scanner for deriving an electronic representation of an original image, including a generally linear array of photosites detecting the intensity of light from the original image, means for providing relative movement between the photosite array and the original image to allow the original image to be scanned by the photosites; and variable control characteristics selectable by an operator for controlling the processing of the electronic representation of the original image, a control information input arrangement including:

a control member having imprinted on a first surface a series of sensor detectable control indicia, each indicia representative of a selectable variable control characteristic;

said control member supported at a position adjacent the scanning path for scanning by the photosites at a non-image scanning time, and movably supported to bring a selected one of said control indicia to a scanning position for scanning said control indicia;

a counter for counting the number of photosites in the array at which a portion of the control indicia is detected to produce a count number;

means for enabling said counter upon detection of the selected control image; and means for determining from said counted number the control characteristic to be applied to said scanned image based on a stored look-up table correlating the counted number to the control characteristic to be applied.

13. The device as defined in claim 12 wherein each said control indicia includes a line on a contrasting background, arranged for detection by said photosite array on said first surface and oriented with a long edge parallel to the array of photosites.

14. The device as defined in claim 13 wherein said line on said contrasting background includes at least one transition from the background to the line.

15. The device as defined in claim 14 wherein said means for enabling said counter includes a transition detecting arrangement, wherein upon detection of a first transition, counting is started.

16. The device as defined in claim 15 wherein said transition detecting arrangement stops counting by said counter if a second transition is detected.

17. The device as defined in claim 12 wherein the control characteristic to be applied to the electronic representation of the original image is a threshold function.

18. The device as defined in claim 12 wherein the control characteristic to be applied to the electronic representation of the original image is a screening function.

19. The device as defined in claim 12 wherein the control characteristic to be applied is one of a selected group of screening and threshold functions.

20. The control information input arrangement as defined in claim 12 and including a second surface, movable in accordance with said first surface movement, and providing operator viewable indications of the selected control characteristics.

* * * * *